United States Patent
Lee et al.

(10) Patent No.: US 10,569,608 B1
(45) Date of Patent: Feb. 25, 2020

(54) AMPHIBIOUS VEHICLE WITH FORWARD SHAPE TRANSFORMING SYSTEM

(71) Applicant: AGENCY FOR DEFENSE DEVELOPMENT, Daejeon (KR)

(72) Inventors: Soo-In Lee, Daejeon (KR); Jeong-Il Seo, Daejeon (KR); Kyo-Gun Chang, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 16/412,874

(22) Filed: May 15, 2019

(30) Foreign Application Priority Data

Mar. 29, 2019 (KR) .................. 10-2019-0037174

(51) Int. Cl.
*B60F 3/00* (2006.01)
*B63B 39/06* (2006.01)

(52) U.S. Cl.
CPC ............ *B60F 3/0038* (2013.01); *B63B 39/06* (2013.01)

(58) Field of Classification Search
CPC .............................. B60F 3/0038; B63B 39/06
See application file for complete search history.

(56) References Cited

U.S. PATENT DOCUMENTS

| | | | | |
|---|---|---|---|---|
| 3,983,832 A * | 10/1976 | Kinder | ................. | B60F 3/0038 440/12.63 |
| 4,953,492 A * | 9/1990 | Duffty | ................. | B60F 3/0007 114/282 |
| 5,027,737 A * | 7/1991 | Duffty | ................. | B60F 3/0007 440/12.54 |
| 5,765,497 A * | 6/1998 | Thomas | ................ | B60F 3/0046 440/12.5 |
| 8,002,596 B2* | 8/2011 | Wernicke | ............. | B60F 3/0007 114/285 |
| 10,144,257 B2* | 12/2018 | Oshima | ..................... | B60F 3/00 |
| 10,293,649 B2* | 5/2019 | Oshima | ..................... | B63B 1/32 |

FOREIGN PATENT DOCUMENTS

| | | |
|---|---|---|
| JP | 2016-088145 A | 5/2016 |
| KR | 10-2008-0066466 A | 7/2008 |
| KR | 10-2016-0069189 A | 6/2016 |

* cited by examiner

*Primary Examiner* — S. Joseph Morano
*Assistant Examiner* — Jovon E Hayes
(74) *Attorney, Agent, or Firm* — LRK Patent Law Firm

(57) ABSTRACT

The proposed technology relates to an amphibious vehicle with a forward shape transforming system and, more particularly, to an amphibious vehicle with a forward shape transforming system that can adjust resistance in traveling by adjusting an aspect ratio by changing the length of the amphibious vehicle.

The present invention has been made in an effort to solve the problems and an object of the present invention is to maintain a posture and reduce resistance on the water by increasing the length of a vehicle body by configuring a front extension unit that moves by sliding on the front of an amphibious vehicle.

20 Claims, 13 Drawing Sheets

AMPHIBIOUS VEHICLE WITH FORWARD SHAPE TRANSFORMING SYSTEM

CROSS REFERENCE TO RELATED APPLICATION(S)

This application claims the benefit of Korean Patent Application No. 10-2019-0037174, filed on Mar. 29, 2019, which is hereby incorporated by reference in its entirety into this application.

BACKGROUND OF THE INVENTION

1. Technical Field

The proposed technology relates to an amphibious vehicle with a forward shape transforming system and, more particularly, to an amphibious vehicle with a forward shape transforming system that can adjust resistance in traveling by adjusting an aspect ratio by changing the length of the amphibious vehicle.

2. Description of Related Art

In general, an amphibious vehicle, which is a vehicle reaching the ground by going ashore after traveling on the water, can be classified as a military amphibious vehicle.

Such an amphibious vehicle is designed to be able to float on the water through sufficient buoyancy and sealing design. Further, the amphibious vehicle moves by rotating wheels or a track and uses water-exclusive additional devices such as a propeller, a duct fan, and a water jet.

A front flap or a rear flap that can transform is mounted to easily go through waves in high-speed acceleration on the water, and flow is guided by transformation thereof in some cases.

For example, the length of a vehicle is increased in most cases by spacing a front flap from the vehicle body with respect to a hinge point at a front lower portion of the vehicle body.

However, movement on the ground should be considered for most amphibious vehicles, unlike ships, so the length of the vehicles has to be limited. Further, when a wave higher than a front flap approaches, water flows into an empty space between the front flap and the front of the vehicle body, so minus trim is caused. Further, the front flap confines water falling down from the upper portion of the vehicle, which considerably deteriorates the floating safety.

SUMMARY OF THE INVENTION

The present invention has been made in an effort to solve the problems and an object of the present invention is to maintain a posture and reduce resistance on the water by increasing the length of a vehicle body by configuring a front extension unit that moves by sliding on the front of an amphibious vehicle.

In order to achieve the objects of the present invention, an amphibious vehicle with a forward shape transforming system, includes: a front extension unit disposed on a front surface of a vehicle body and left and right sides of the vehicle body that extend a predetermined length from the front surface of the vehicle body; and a moving unit moving forward or returning the front extension unit in a traveling direction of the vehicle body, in which the front extension unit is installed to overlap the front surface and the left and right sides of the vehicle body, and an aspect ratio of the vehicle body is adjusted in accordance with a movement distance of the front extension unit from the vehicle body, so traveling resistance is adjusted.

The front extension unit may have: a front surface portion; edge surfaces bending a predetermined angle respectively from both ends of the front surface portion and extending a predetermined length away from each other; and side plates extending a predetermined length respectively from ends of the edge surfaces to come in contact with the sides of the vehicle body.

A plurality of fastening portions arranged in a straight line in a front-rear direction of the vehicle body may be formed on inner surfaces of the side plates.

The moving unit may include: guide holes respectively formed at both sides of the vehicle body and elongated a predetermined length in the front-rear direction of the vehicle body; coupling portions coupled to rearmost fastening portions of the fastening portions inserted in the guide holes; and driving units pushing or pulling the coupling portions in a front-rear direction of the guide holes.

The fastening portions may be moved along the guide holes by movement of the coupling portions.

The front extension unit may be moved forward or returned with respect to the vehicle body by movement of the fastening portions.

Bellows type moving members hinged to the coupling portions and pushing or pulling the coupling portions by stretching and contracting may be disposed at rear ends of the coupling portions.

Rear ends of the moving members may be hinged to the driving units.

When the coupling portions have been pulled to rearmost portions of the guide holes, the rearmost fastening portions may be in contact with the rearmost portions of the guide holes and the front extension unit may have been returned to overlap the vehicle body.

When the coupling portions have been pushed to foremost portions of the guide holes, foremost fastening portions of the fastening portions may be in contact with the foremost portions of the guide holes and the front extension unit may have reached a forward limit length.

The guide holes may include a straight hole elongated a predetermined length in the front-rear direction of the vehicle body, and a diverging hole extending toward a bottom of vehicle body from the straight hole.

A plurality of diverging holes may be formed and spaced apart from each other with the same gaps in a longitudinal direction of the straight hole.

The diverging holes may be formed to be inclined at a predetermined angle toward a rear of the vehicle body.

The diverging holes may be formed to be inclined at a predetermined angle toward a front of the vehicle body.

When the diverging holes are formed toward the front of the vehicle body, a recessed hole extending a predetermined length toward the rear of the vehicle body may be formed at lower ends of the diverging holes.

The guide holes may include: a plurality of up-down holes extending a predetermined length toward a bottom from a top of the vehicle body and having a lower end inclined at a predetermined angle toward a rear of the vehicle body; and connecting holes connecting an upper end of any one up-down hole of the plurality of up-down holes and a lower end of another up-down hole positioned adjacently behind the any one up-down hole.

The coupling portions have a size and a shape such that the coupling portions are not separated out of the vehicle body through the guide holes.

Guide fins for guiding flow traveling rearward from ahead of the vehicle body under the vehicle body may be formed on outer surfaces of the edge surfaces.

The guide fins may have a plate shape protruding a predetermined length from the outer surfaces of the edge surfaces.

A water guide for guiding water, which flows rearward from ahead of the vehicle body, from flowing to the top of the vehicle body, to left and right of the vehicle body may be formed on a front inclined portion of the vehicle body.

The water guide may be a part formed by protruding a center portion of the front inclined portion with respect to left and right sides.

The front extension unit may be formed in a shape that is received in a portion where the front extension unit is installed on the vehicle body.

The edge surfaces may be formed in a plane shape or a curved shape.

A drainage hole for discharge water flowing inside from ahead of the vehicle body may be formed at the side plates.

A plurality of drainage holes may be formed and spaced apart from each other with predetermined gaps.

Recessed drainage portions cut at a predetermined depth toward lower ends from upper ends of the side plates may be formed at the side plates.

According to the present invention, the length of an amphibious vehicle is increased by disposing a front extension unit that moves by sliding is disposed on the front of an amphibious vehicle, thereby being able to maintain a posture and reduce resistance on water.

Further, it is possible to reduce pitching according to water situation because the aspect ratio of increased.

Further, by increasing a change of a trim angle by adjusting the movement distance of the front extension unit, it is possible to suppress water flowing over the vehicle body.

Further, by moving the front extension unit using a moving unit, it is possible to achieve high-speed traveling performance with high reliability at a low cost.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
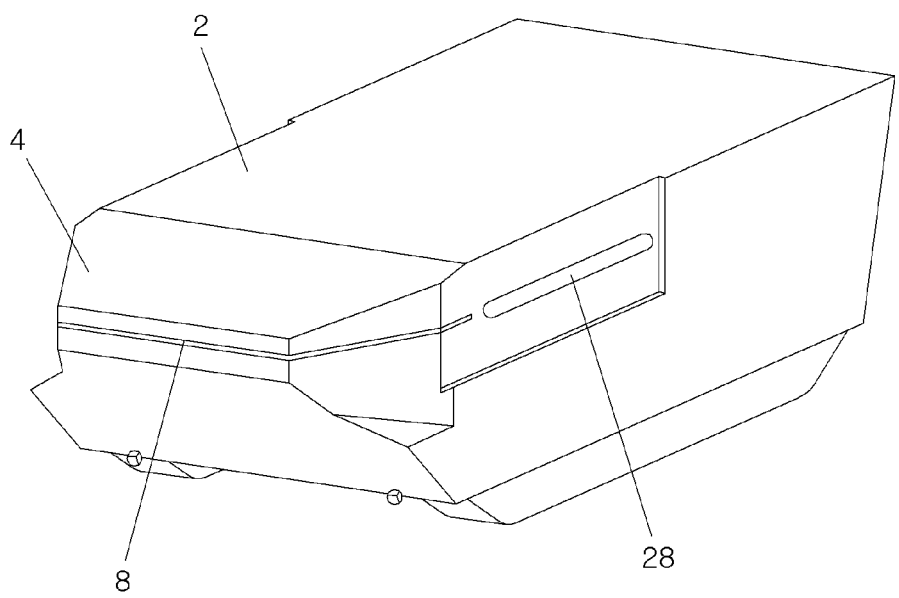
FIG. 1 is a conceptual view of an amphibious vehicle according to the present invention.

The features and advantages of the present invention described above will be clearer through the following detailed description relating to the accompanying drawing, so the spirit of the present invention would be easily implemented by those skilled in the art. The present invention may be modified in various ways and implemented by various exemplary embodiments, so that specific exemplary embodiments are shown in the drawings and will be described in detail herein. However, it is to be understood that the present invention is not limited to the specific exemplary embodiments, but includes all modifications, equivalents, and substitutions included in the spirit and the scope of the present invention. Terms used in the present specification are used only in order to describe specific exemplary embodiments rather than limiting the present invention.

Hereinafter, exemplary embodiments of the present invention are described in detail with reference to the accompanying drawings.

The present invention relates to an amphibious vehicle with a forward shape transforming system and, more particularly, to an amphibious vehicle with a forward shape transforming system that can adjust resistance in traveling by adjusting an aspect ratio by changing the length of the amphibious vehicle.

Figure 2:
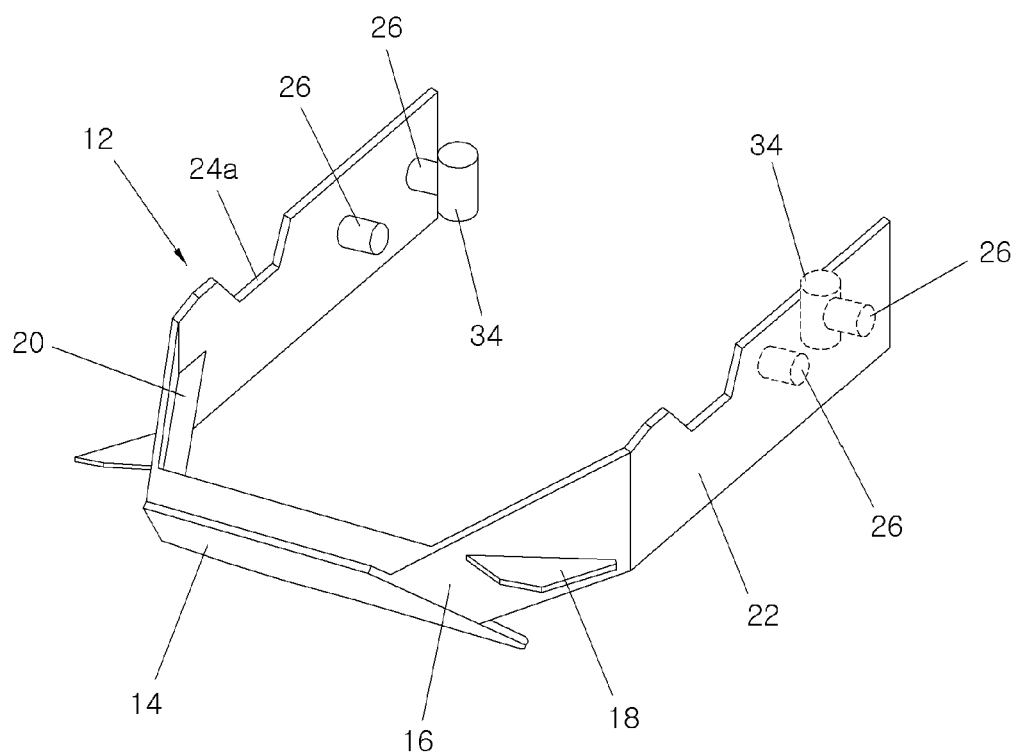
FIG. 2 is a conceptual view of a front extension unit of an amphibious vehicle according to the present invention.

FIG. 1 is a conceptual view of an amphibious vehicle according to the present invention and FIG. 2 is a conceptual view of a front extension unit of an amphibious vehicle according to the present invention.

In order to change the front shape of an amphibious vehicle, an amphibious vehicle according to the present invention includes a front extension unit 12 disposed on the front surface of a vehicle body of the amphibious vehicle and the left and right sides of the vehicle body 2 that extend a predetermined length from the front surface of the vehicle body 2, and a moving unit moving forward or returning the front extension unit 12 in the traveling direction of the vehicle body 2.

The front extension unit 12 is formed in a shape that is received in the portion where the front extension unit 12 is installed on the vehicle body 2. That is, the front extension unit 12 is formed in a U-shape open toward the vehicle body 2 and is installed to overlap the front surface and the left and right sides of the vehicle body 2.

Grooves corresponding to the shape and thickness of the front extension unit 12 are formed at the portion where the front extension unit 12 is installed of the vehicle body 2 so that the front extension unit 12 does not protrude from the vehicle body 2 when the front extension unit 12 completely overlapping the vehicle body 2 without being spaced from the vehicle body 2.

Figure 3:
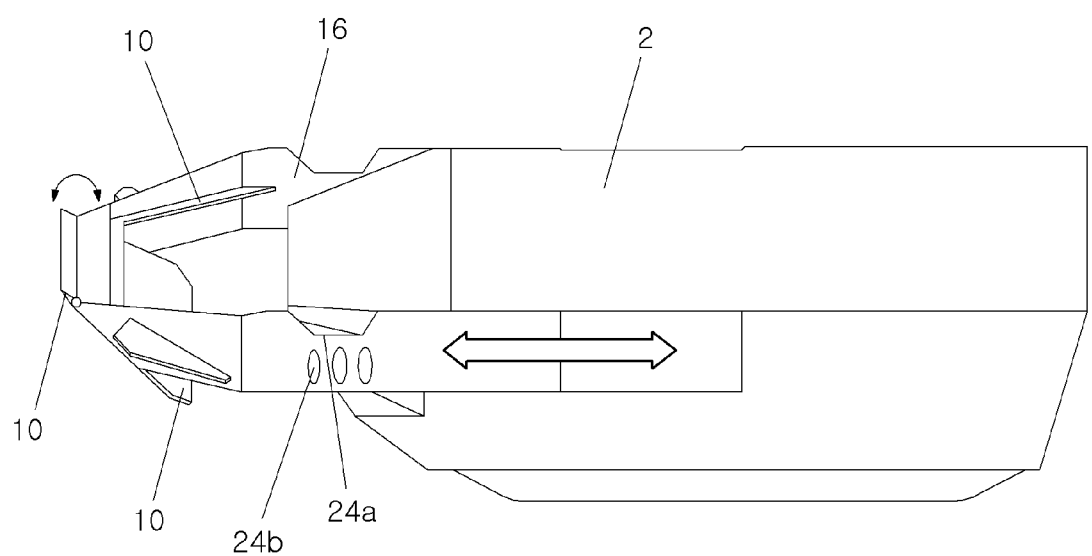
FIG. 3 is a conceptual view when the vehicle body and the front extension unit of an amphibious vehicle according to the present invention are combined.
Figure 4:
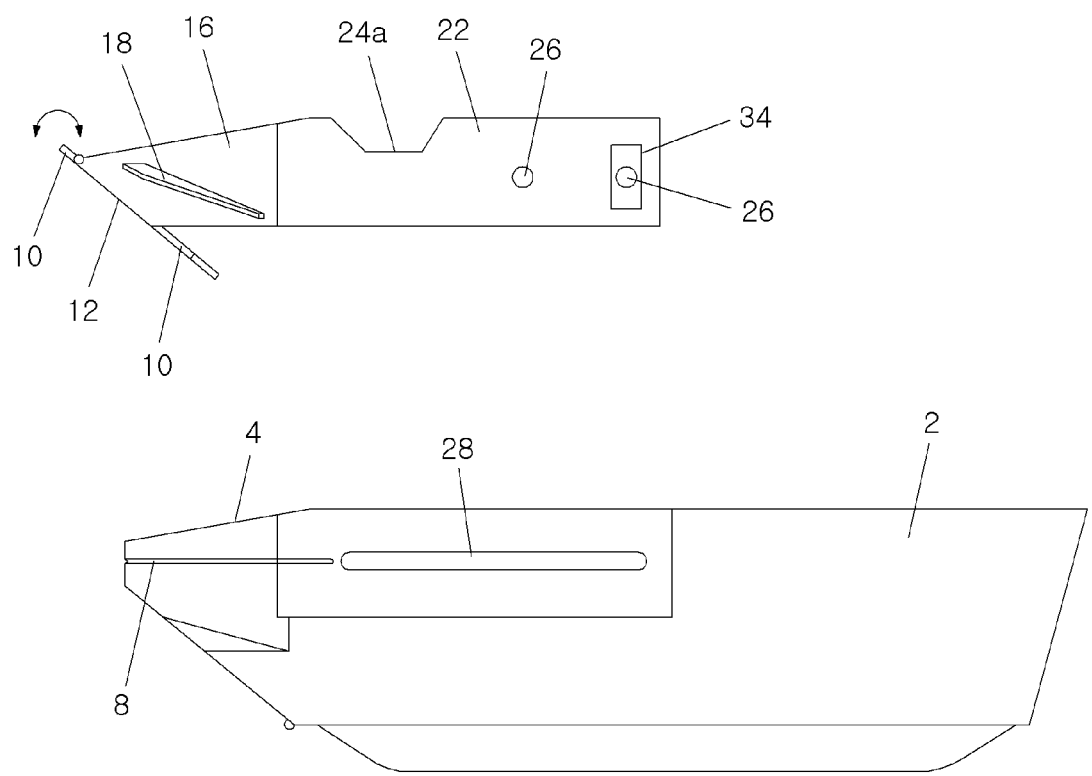
FIG. 4 is a side view of the vehicle body and the front extension unit of an amphibious vehicle according to the present invention.

FIG. 3 is a conceptual view when the vehicle body and the front extension unit of an amphibious vehicle according to the present invention are combined and FIG. 4 is a side view of a front extension unit of an amphibious vehicle according to the present invention.

The front extension unit 12 has a front surface portion 14, edge surfaces 16 bending a predetermined angle respectively from both ends of the front surface portion 14 and extending a predetermined length away from each other, and side plates 22 extending a predetermined length respectively from ends of the edge surfaces 16 to come in contact with the sides of the vehicle body.

The edge surfaces 16, which are formed in a shape of which the projective area gradually increases from the front surface to the rear surface of the vehicle body 2 to reduce resistance by water in traveling on water, may be formed in a plane shape or a curved shape, as shown in the figures.

Flow approaching from ahead of the vehicle body 2 is guided to the left and right of the vehicle body 2 by the edge surfaces 16 formed in the shape described above, whereby it is possible to reduce resistance that is applied to the front extension unit 12.

In order to more efficiently reduce the resistance due to flow, guide fins 18 for guiding flow traveling rearward from ahead of the vehicle body 2 under the vehicle body 2 may be formed on the outer surfaces of the edge surfaces 16.

The guide fins 18 may be formed in a plate shape protruding a predetermined length from the outer surfaces of the edge surfaces 16, that is, may protrude perpendicular to the edge surfaces 16 or may protrude at a predetermined angle upward or downward from the vehicle body 2.

The guide fins 18 may be formed in the front-rear direction of the vehicle body 2 to be parallel with the ground or may be formed at an angle to be closer to the ground as they go rearward from the front of the vehicle body 2.

The protrusive angle of the guide fins 18 to the edge surfaces 16 and the inclined angle of the guide fins 18 in the front-rear direction of the vehicle body 2 can be adjusted in accordance with the center of gravity and shape of the amphibious vehicle.

Since flow approaching from ahead of the vehicle body 2 is guided under the vehicle body 2 by the guide fins 18 formed as described above, the situation in which flow divided to the left and right by the edge surfaces 16 comes into the upper portion of the vehicle body is suppressed, and maintaining a positive trim angle is helped. Further, insufficient rigidity of the front extension unit 12 can be reinforced.

A reinforcing flange 20 for improving the strength of the front extension unit 12 is formed on the front surface portion 14 of the front extension unit 12 and the inner surfaces of the edge surfaces 16.

The reinforcing flange 20 protrudes a predetermined length from the front surface portion 14 and the edge surfaces 16 and is formed in a plate shape parallel with the ground.

A reinforcing flange groove 8 for removing interference between the vehicle body 2 and the reinforcing flange 20 when the front extension unit 12 does not slide forward from the vehicle body 2 is formed at a portion corresponding to the reinforcing flange 20 on the vehicle body 2.

The side plates 22 and the edge surfaces 16 are formed perpendicular to the ground, but the front surface portion 14 of the front extension unit 12 may be formed to be inclined toward the side plates 22 as it goes from the upper end to the lower end. This is configuration for reducing resistance of flow approaching from ahead of the vehicle body 2 when the vehicle is driven in water.

Extensive water receiving portions 10 protruding a predetermined length in the up-down direction more than the side plates 22 and the edge surfaces 16 may be formed on the front surface portion 14 to effectively maintain a positive trim angle.

The influence by a trim angle according to the speed of the vehicle is large, depending on the distance from the lower portion of the front surface portion 14 to the vehicle body 2 or the length of the extensive water receiving portion 10 protruding downward further than the edge surfaces 16. Accordingly, the length of the extensive water receiving portion 10 protruding downward from the front surface portion 14 can be determined to fit to a desired target speed and design specifications.

The extensive water receiving portion 10 protruding from the upper portion of the front surface portion 14 may be formed to suppress water flowing over the vehicle body 2.

The extensive water receiving portions 10 formed at the upper portion and the lower portion of the front surface portion 14 may be coupled to hinge-likely move and slide to the upper end and the lower end of the front surface portion 14.

The extensive water receiving portions 10 formed as describe d above may be formed to be stowed in a normal state and deployed if necessary, or may be made of a transparent material to be always in a deployed state.

Figure 5:
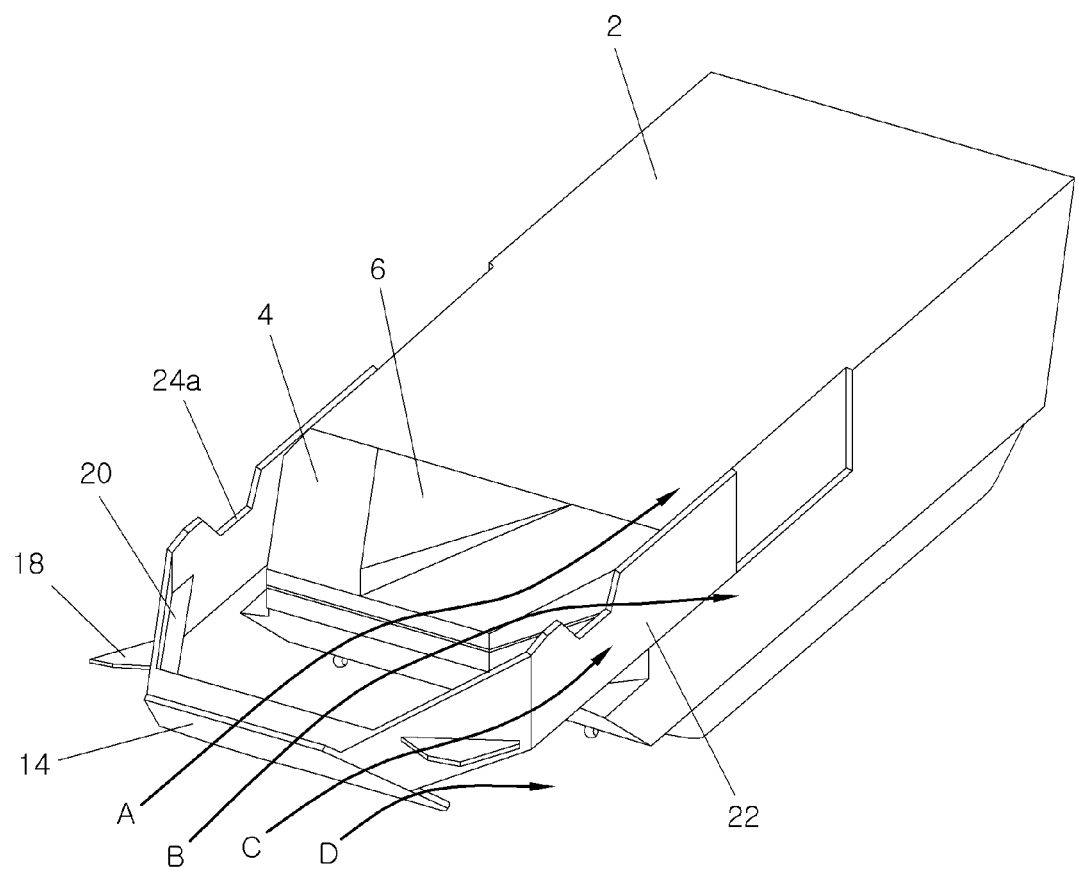
FIG. 5 is a conceptual view of the flow of water when the front extension unit of an amphibious vehicle according to the present invention has been deployed.

FIG. 5 is a conceptual view of the flow of water when the front extension unit of an amphibious vehicle according to the present invention has been deployed.

In general, amphibious vehicles are driven by an internal combustion engine and are necessarily equipped with an intake/exhaust system etc. Accordingly, it is required in the design step to minimize water that flows inside through the top of the vehicle body 20.

To this end, in the present invention, as shown in FIG. 5, a water guide 6 for preventing water, which flows rearward from ahead of the vehicle body 2, from flowing to the top of the vehicle body, like the flow A shown in FIG. 5, and for guiding the water to the left and right of the vehicle body 2 is formed on a front inclined portion 4 of the vehicle body 2.

The water guide 6 is a part formed by protruding the center portion of the front inclined portion 4 with respect to left and right sides. Although the water guide 6 is shown as having the same height as the uppermost surface of the vehicle body 2 and protruding in a V-shape in the traveling direction of the vehicle body 2, it can be formed in any shape as long as it can guide water to the left and right of the vehicle body 2, as shown in FIG. 5.

In order to smoothly discharge water flowing inside from ahead of the vehicle body 2, a plurality of drainage holes spaced apart predetermined gaps from each other may be formed at the side plates 22, or as shown in the figures, recessed drainage portions 24a cut at a predetermined depth toward the lower ends from the upper ends of the side plates 22 may be formed.

A plurality of fastening portions 26 perpendicularly protruding a predetermined length from the inner surfaces of the side plates 22 and arranged in a straight line in the front-rear direction of the vehicle body 2 is formed on the inner surfaces of the side plates 22. The front extension unit 12 is connected to the moving unit by the fastening portions 26.

Figure 6:
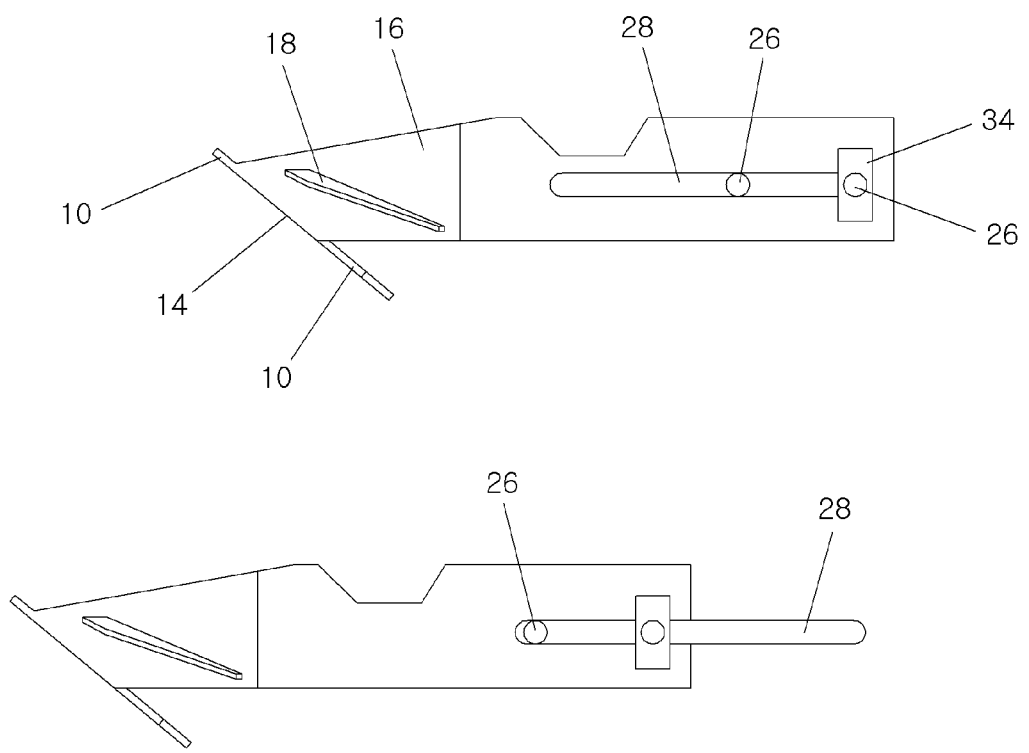
FIG. 6 is a conceptual view when the front extension unit of an amphibious vehicle according to the present invention is moved.

FIG. 6 is a conceptual view when the front extension unit of an amphibious vehicle according to the present invention is moved.

According to the present invention, as the front extension unit 12 is moved in the front-rear direction with respect to the vehicle body 2, the aspect ratio of the vehicle body 2 is adjusted in accordance with the movement distance of the front extension unit 12 from the vehicle body 2, thereby maintaining a posture on water and adjusting traveling resistance. Accordingly, the moving unit is configured to move the front extension unit 12 with respect to the vehicle body 2.

Several plans can be considered to translate the front extension unit 12 forward from the vehicle body 2 and the front extension unit 12 is translated using the moving unit in an embodiment of the present invention.

The moving unit includes: guide holes 28 respectively formed at both sides of the vehicle body 2 and elongated a predetermined length in the front-rear direction of the vehicle body 2; coupling portions 34 coupled to the rearmost fastening portions of the fastening portions 26 inserted in the guide holes 28; and driving units 32 pushing or pulling the coupling portions 34 in the front-rear direction of the guide holes 28.

The coupling portions 34 are formed to have a size and a shape such that they are not separated out of the vehicle body 2 through the guide holes 28.

The fastening portions 26 are inserted in the vehicle body 2 through the guide holes 28 and the rearmost fastening portions of the fastening portions 26 are coupled to the coupling portions 26.

The fastening portions 26 are moved along the guide holes 28 by movement of the coupling portions 34, and the front extension unit 12 is moved forward or returned with respect to the vehicle body 2 by movement of the fastening portions 26.

Movement of the coupling portions 34 may be achieved by directly coupling the coupling portions 34 and the driving units 32, but may be achieved by bellows type moving members 30 that are hinged to the rear ends of the coupling portions 34 and push or pull the coupling portions 34 by stretching and contracting.

When the moving members 30 are connected to the coupling portions 34, the rear ends of the moving members 30 are connected to the driving units 32, so the driving units 32 move the coupling portions 34 by pushing or pulling the moving members 30.

Figure 7:
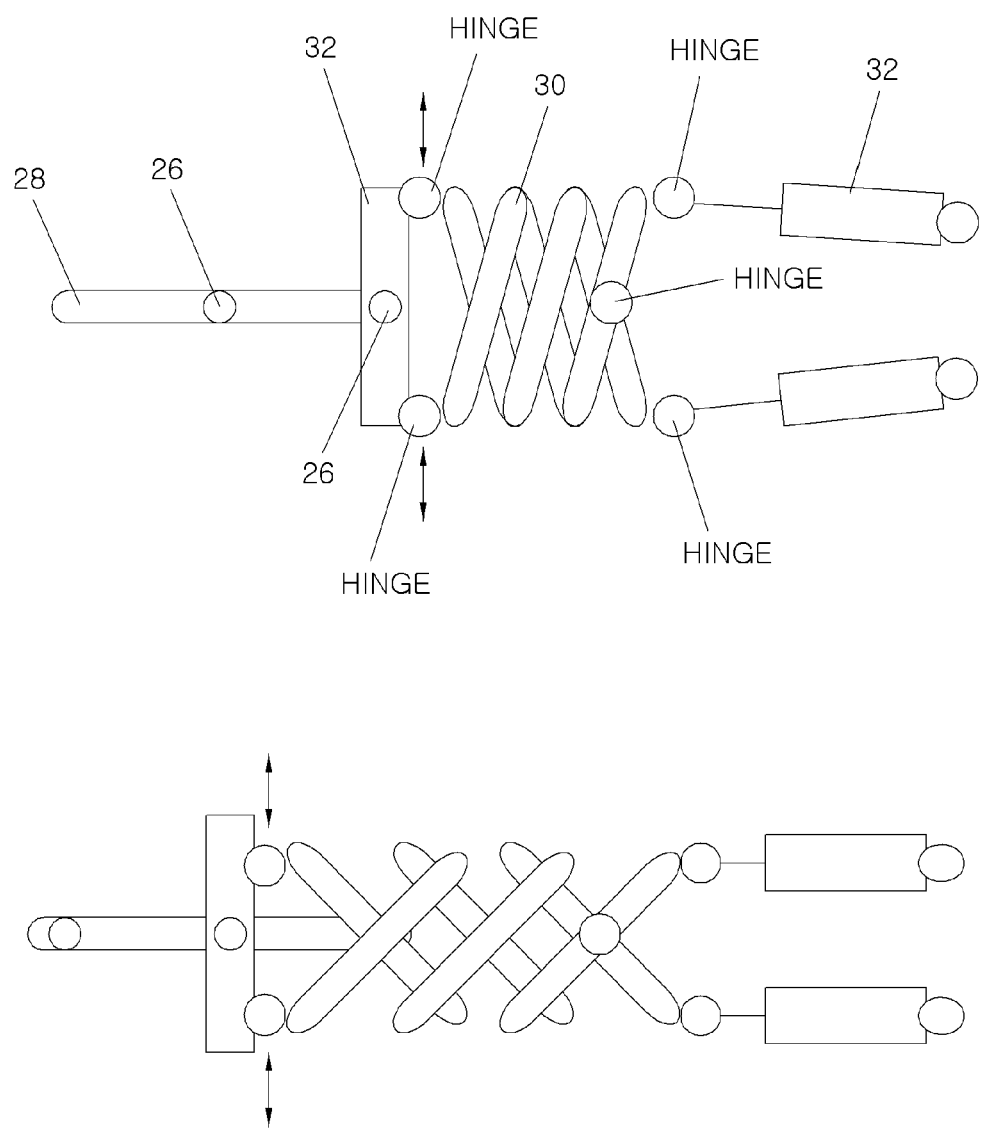
FIG. 7 is a view of a first embodiment of a moving unit according to the present invention.

The moving members 30 are described in more detail. The moving members 30 have a bellows shape including X-shaped movable links connected to each other. As shown in FIG. 7, when the driving units 32 respectively installed at both rear ends of the moving member 30 pull the moving member 30 such that both rear ends of the moving member 30 come close to each other, the moving member 30 is stretched and pushes the coupling portion 34. Accordingly, the moving member 34 is moved toward the front of the vehicle body 2.

When the driving units 32 push the moving member 30 such that both rear ends of the moving member open away from each other, the moving member 30 contracts and pulls the coupling portion 34, whereby the coupling portion 34 is moved toward the rear of the vehicle body 2.

That is, the coupling portions 34 move in the front-rear direction of the vehicle body when the moving members 30 are stretched or contracted, and the fastening portions 26 are moved in the front-rear direction of the guide hole 28 along the guide holes 28 by movement of the coupling portions 34.

The front extension unit 12 is moved forward and rearward with respect to the vehicle body 2 by movement of the fastening portions 26.

When the coupling portions 34 have been pulled to the rearmost portions of the guide holes 28, the rearmost fastening portions are in contact with the rearmost portions of the guide holes 28 and the front extension unit 12 has been returned to overlap the vehicle body 2.

When the coupling portions 34 have been pushed to the foremost portions of the guide hole 28, the foremost fastening portions of the fastening portions 26 are in contact with the foremost portions of the guide holes 28 and the front extension unit 23 has been maximally spaced apart from the front of the vehicle body 2.

Figure 8:
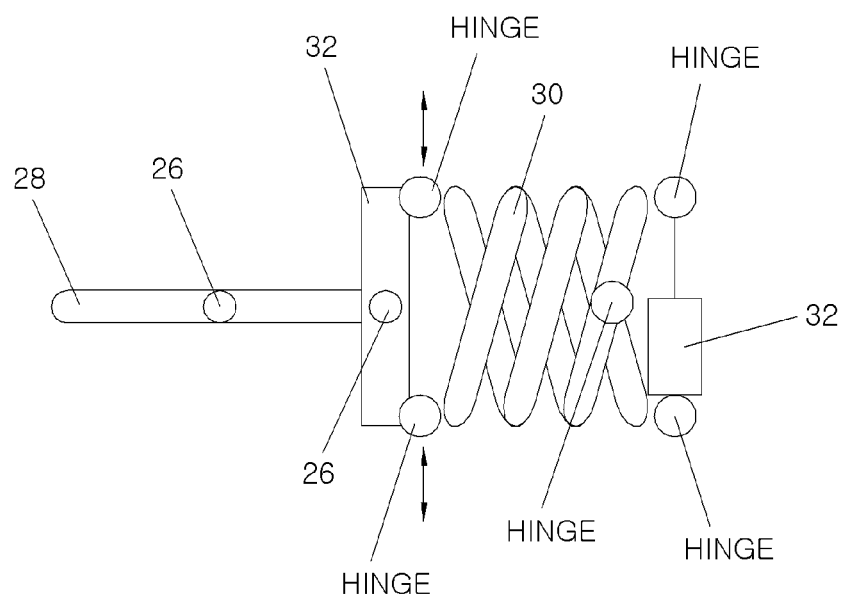
FIG. 8 is a view of a second embodiment of a moving unit according to the present invention.
Figure 8:
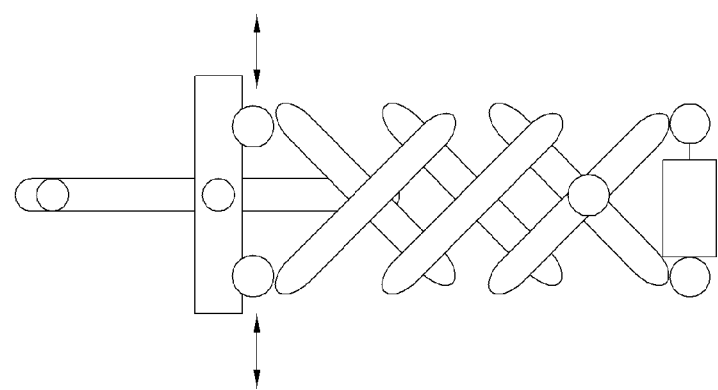

As shown in FIG. 8, one driving unit 32 may be installed to connect both rear ends of the moving member 30, so the moving member 30 can be contracted or stretched by adjusting the length of the driving unit 32.

Figure 9:
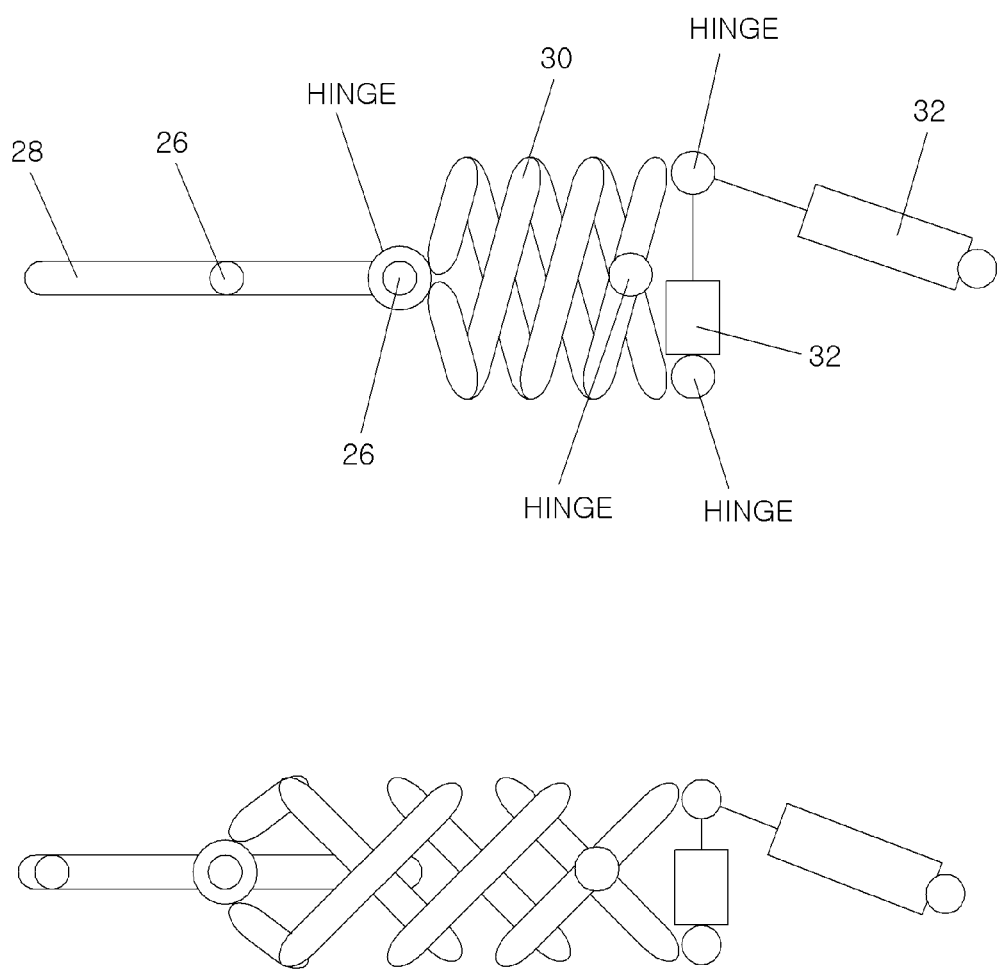
FIG. 9 is a view of a third embodiment of a moving unit according to the present invention.
Figure 10:
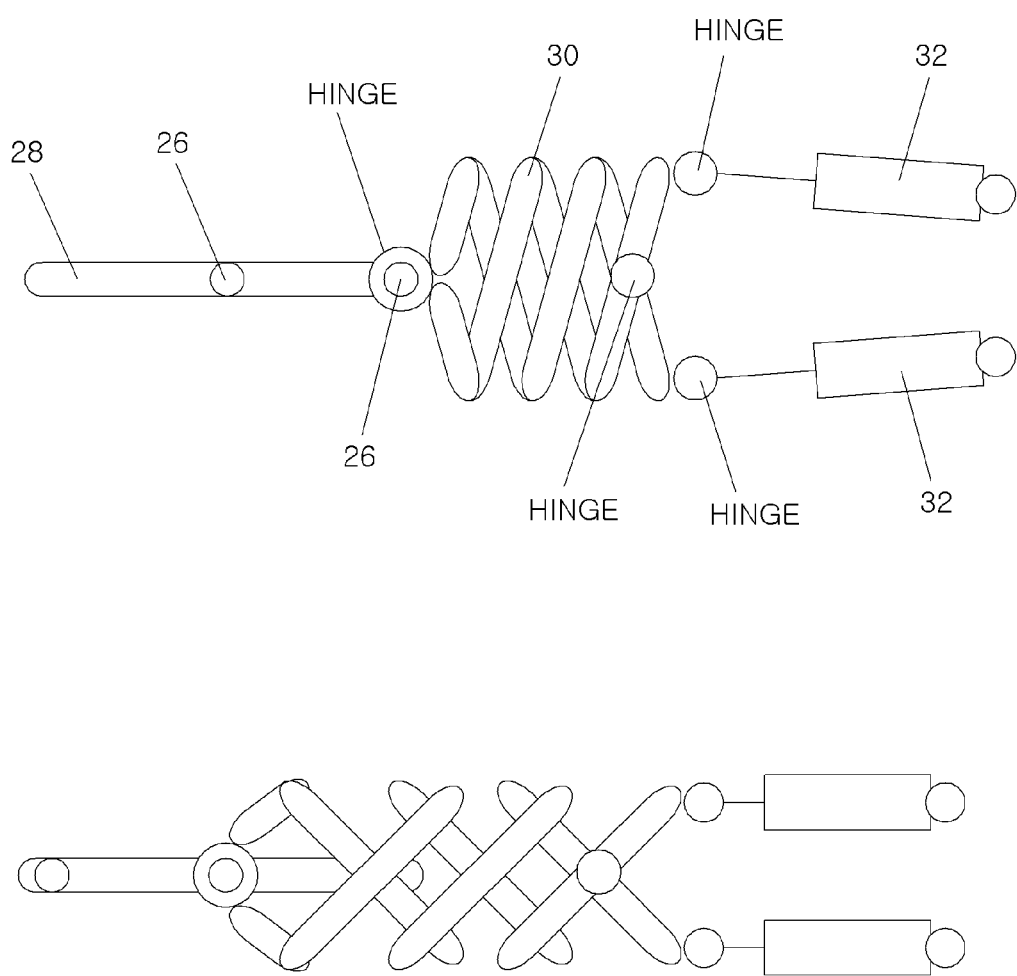
FIG. 10 is a view of a fourth embodiment of a moving unit according to the present invention.

Further, as shown in FIG. 9 or 10, the coupling portions 34 may be removed, the movable links at both front sides of the moving member 30 may be formed to meet a the center not in the X-shape, and the front center of the moving member 30 and the rearmost fastening portion are hinged. Accordingly, when the moving member 30 is contracted or stretched, the moving member 30 can slide the front extension unit 12 by directly push or pull the rearmost fastening portion.

That is, the driving unit 32 may be configured in any type as long as it can contract and stretch the moving member 30.

The moving unit generates large displacement of the front extension unit 12 by amplifying slight movement that is generated by the driving units 32, and for this purpose, a plurality of hinges is applied. However, when the connection manner such as hinging is applied, as described above, it is unavoidably weak to allowable load and a load change in terms of structure, which necessarily acts as a disadvantageous factor to the front extension unit 12 that has to stably divide waves while maintaining a posture.

When the vehicle body 2 travels straight, external force is applied from the front to the rear, and when the vehicle body 2 travels backward, very small external force or reverse stream is generated from the rear to the front due to the shape of the vehicle body 2. Accordingly, problematic external force is the external force that is applied from the front to the rear.

Accordingly, the shape of the guide holes 28 is changed in the present invention to solve this problem.

Figure 11:
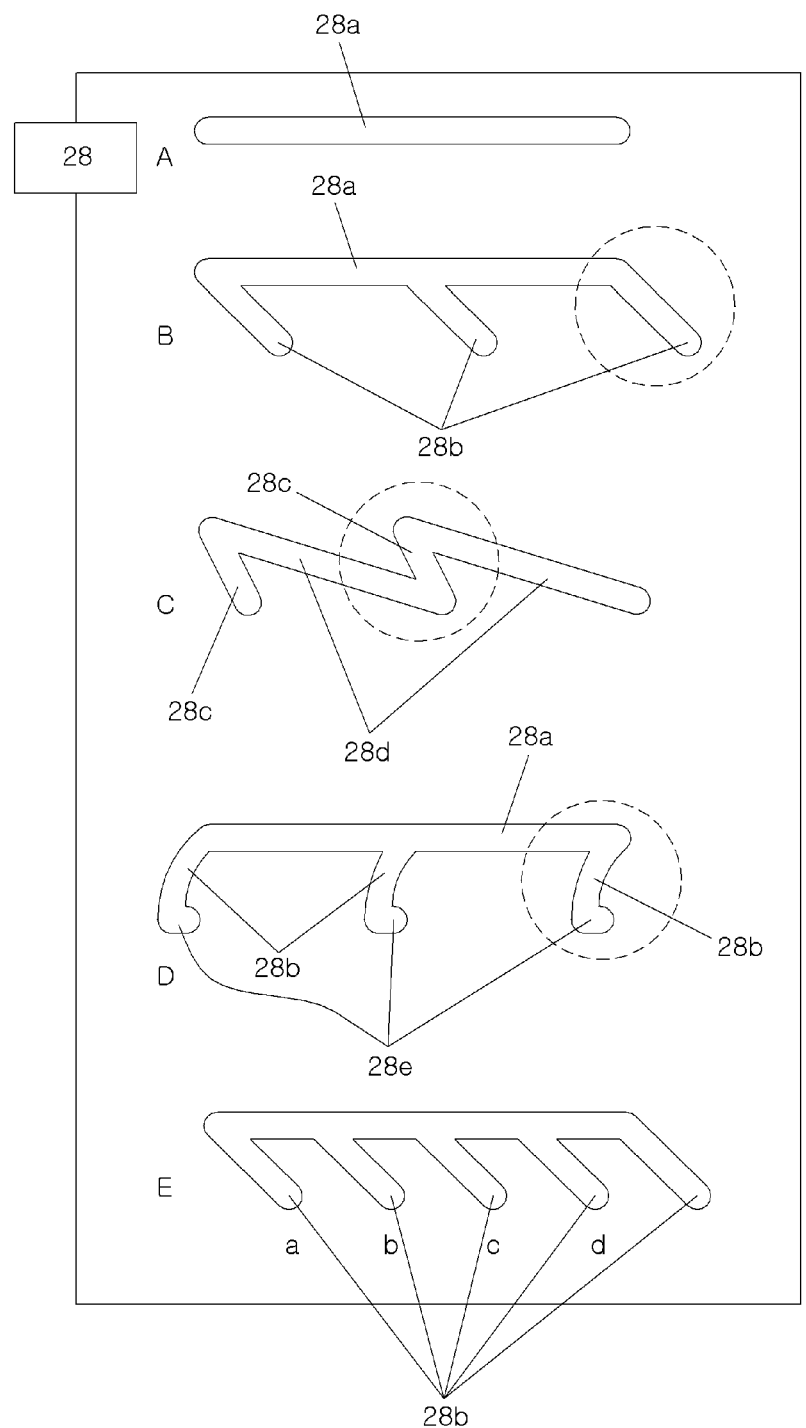
FIG. 11 is an embodiment of a guide hole according to the present invention.

FIG. 11 shows an example of guide holes according to the present invention.

Figure 12:
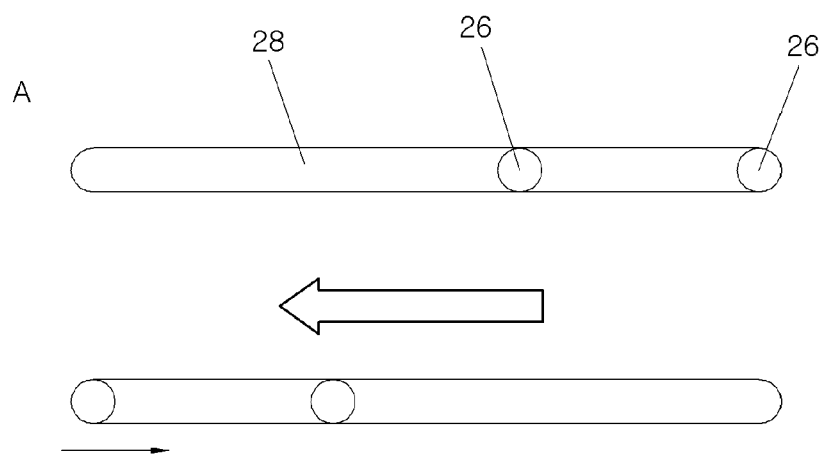
FIG. 12 is a first exemplary view of a fastening portion according to the shape of a guide hole according to the present invention.

As for a simple straight line shown at A in FIG. 11, when the front extension unit 12 is deployed simply straight, as shown in FIG. 12, the fastening portions 26 may be pushed to the rear of the vehicle body by external force.

Accordingly, guide holes may be formed to have diverging holes 28b diverging from the straight hole 28a or to have recessed holes 28e extending from the diverging holes 28b, not in the shape of the simply straight hole 28a shown at A in FIG. 11.

The guide holes 28, as shown at B and E in FIG. 11, may include the straight hole 28a formed with a predetermined length in the front-rear direction of the vehicle body 2 and the diverging holes 28b extending toward the bottom of the vehicle body 2 from the straight hole 28a. A plurality of diverging holes 28b may be formed and spaced apart from each other with the same gaps in the longitudinal direction of the straight hole 28a.

When a plurality of diverging holes 28b is formed, as shown at E in FIG. 11, the deployment length of the front extension unit 12 can be adjusted, depending on the situation of water. For example, when water is calm, the foremost fastening portions are positioned in the hole 'a' and the rearmost fastening portions are positioned in the hole 'c', whereby it is possible to suppress a trim angle and reduce resistance by maximally moving forward the front extension unit 12, and thus, the cruising speed can be increased.

On the other hand, when the situation of water is bad, the foremost fastening portions are positioned in the hole 'b' and the rearmost fastening portions are positioned in the hole 'd', whereby it is possible to enable the vehicle to stably go through high waves by increasing the trim angle in consideration of an increase in resistance.

The diverging holes 28b may be formed to be inclined at a predetermined angle toward the front of the vehicle body 2, as shown at D in FIG. 11. When the diverging holes 28b are formed toward the front of the vehicle body 2, the recessed holes 28e extending a predetermined length toward the rear of the vehicle body 2 may be formed at the lower ends of the diverging holes 28b.

When the guide holes 28 is formed, as shown at D in FIG. 11, the fastening portions 26 are inserted in the recessed holes 28e and cannot be moved rearward even of external force is applied from the front to the rear of the vehicle body 2 when the vehicle travels backward, so the positions of the fastening portions 26 can be more strongly fixed.

The guide holes 28, as shown at C in FIG. 11, may include: a plurality of up-down holes 28c extending a predetermined length toward the bottom from the top of the vehicle body 2 and having a lower end inclined at a predetermined angle toward the rear of the vehicle body 2; and connecting holes 28d connecting the upper end of any one up-down hole 28c of the up-down holes 28c and the lower end of another up-down hole 28c positioned adjacently behind the any one up-down hole 28c.

Figure 13:
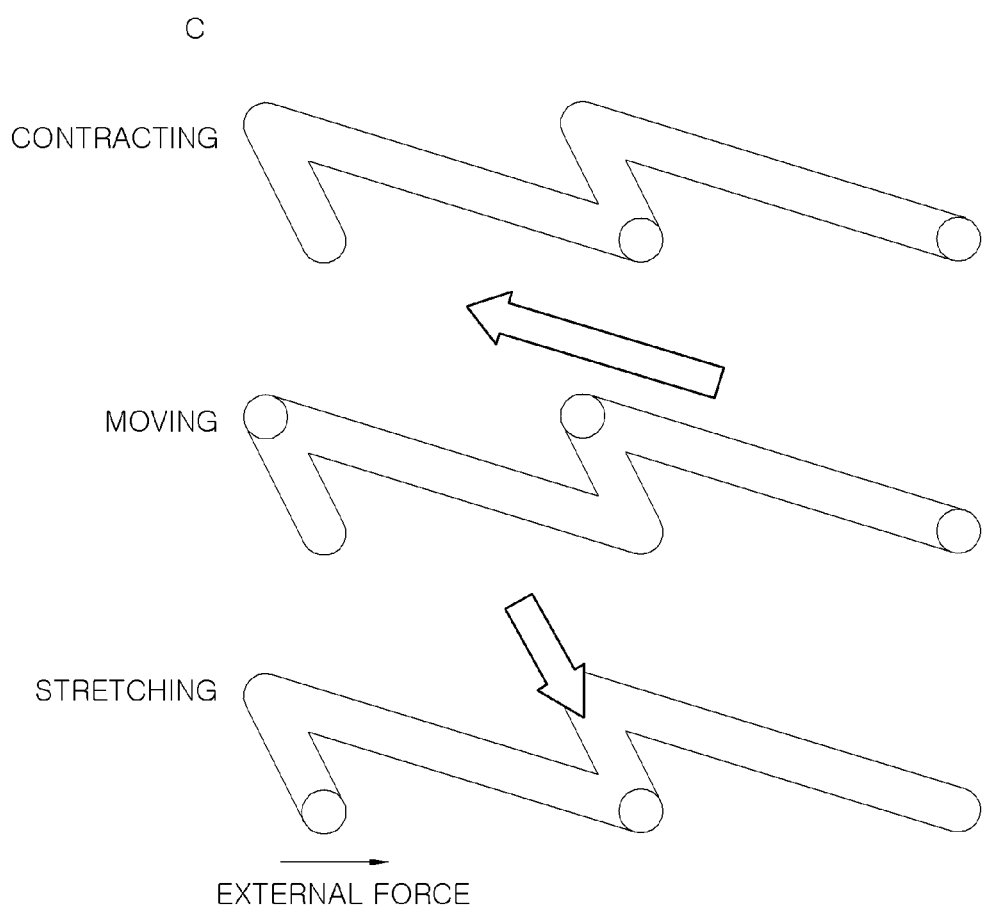
FIG. 13 is a second exemplary view of a fastening portion according to the shape of a guide hole according to the present invention.

When the guide holes 28 are formed like that shown at C in FIG. 11, the fastening portions 26 are moved, as shown in FIG. 13. When the moving members 30 are stretched, external force is applied rearward, so the front extension unit 12 can keep the fixed position without moving even if the driving units 32 break down or power is not supplied.

Although exemplary embodiments of the present invention were described above, it should be understood that the present invention may be changed and modified in various ways by those skilled in the art without departing from the spirit and scope of the present invention described in the following claims.

What is claimed is:

1. An amphibious vehicle with a forward shape transforming system, comprising:
    a front extension unit disposed on a front surface of a vehicle body and left and right sides of the vehicle body that extend a predetermined length from the front surface of the vehicle body; and
    a moving unit moving forward or returning the front extension unit in a traveling direction of the vehicle body,
    wherein the front extension unit is installed to overlap the front surface and the left and right sides of the vehicle body, and
    wherein an aspect ratio of the vehicle body is adjusted in accordance with a movement distance of the front extension unit from the vehicle body, so traveling resistance is adjusted.

2. The amphibious vehicle of claim 1, wherein the front extension unit has:
    a front surface portion;
    edge surfaces bending a predetermined angle respectively from both ends of the front surface portion and extending a predetermined length away from each other; and
    side plates extending a predetermined length respectively from ends of the edge surfaces to come in contact with the sides of the vehicle body.

3. The amphibious vehicle of claim 2, wherein a plurality of fastening portions arranged in a straight line in a front-rear direction of the vehicle body is formed on inner surfaces of the side plates.

4. The amphibious vehicle of claim 3, wherein the moving unit includes:
    guide holes respectively formed at both sides of the vehicle body and elongated a predetermined length in the front-rear direction of the vehicle body;
    coupling portions coupled to rearmost fastening portions of the fastening portions inserted in the guide holes; and
    driving units pushing or pulling the coupling portions in a front-rear direction of the guide holes.

5. The amphibious vehicle of claim 4, wherein the fastening portions are moved along the guide holes by movement of the coupling portions.

6. The amphibious vehicle of claim 5, wherein the front extension unit is moved forward or returned with respect to the vehicle body by movement of the fastening portions.

7. The amphibious vehicle of claim 4, wherein bellows type moving members hinged to the coupling portions and pushing or pulling the coupling portions by stretching and contracting are disposed at rear ends of the coupling portions.

8. The amphibious vehicle of claim 7, wherein rear ends of the moving members are hinged to the driving units.

9. The amphibious vehicle of claim 6, wherein when the coupling portions have been pulled to rearmost portions of the guide holes, the rearmost fastening portions are in contact with the rearmost portions of the guide holes and the front extension unit has been returned to overlap the vehicle body.

10. The amphibious vehicle of claim 6, wherein when the coupling portions have been pushed to foremost portions of the guide holes, foremost fastening portions of the fastening portions are in contact with the foremost portions of the guide holes and the front extension unit has reached a forward limit length.

11. The amphibious vehicle of claim 5, wherein the guide holes include a straight hole elongated a predetermined length in the front-rear direction of the vehicle body, and a diverging hole extending toward a bottom of vehicle body from the straight hole.

12. The amphibious vehicle of claim 11, wherein a plurality of diverging holes is formed and spaced apart from each other with the same gaps in a longitudinal direction of the straight hole.

13. The amphibious vehicle of claim 12, wherein the diverging holes are formed to be inclined at a predetermined angle toward a rear of the vehicle body.

14. The amphibious vehicle of claim 12, wherein the diverging holes are formed to be inclined at a predetermined angle toward a front of the vehicle body.

15. The amphibious vehicle of claim 14, wherein when the diverging holes are formed toward the front of the vehicle body, a recessed hole extending a predetermined length toward the rear of the vehicle body is formed at lower ends of the diverging holes.

16. The amphibious vehicle of claim 5, wherein the guide holes include:
- a plurality of up-down holes extending a predetermined length toward a bottom from a top of the vehicle body and having a lower end inclined at a predetermined angle toward a rear of the vehicle body; and
- connecting holes connecting an upper end of any one up-down hole of the plurality of up-down holes and a lower end of another up-down hole positioned adjacently behind the any one up-down hole.

17. The amphibious vehicle of claim 4, wherein the coupling portions have a size and a shape such that the coupling portions are not separated out of the vehicle body through the guide holes.

18. The amphibious vehicle of claim 2, wherein guide fins for guiding flow traveling rearward from ahead of the vehicle body under the vehicle body are formed on outer surfaces of the edge surfaces.

19. The amphibious vehicle of claim 1,
wherein a water guide for guiding water, which flows rearward from ahead of the vehicle body, from flowing to the top of the vehicle body, to left and right of the vehicle body is formed on a front inclined portion of the vehicle body, and
wherein the water guide is a part formed by protruding a center portion of the front inclined portion with respect to left and right sides.

20. The amphibious vehicle of claim 1, wherein the front extension unit is formed in a shape that is received in a portion where the front extension unit is installed on the vehicle body.

* * * * *